(12) United States Patent
Zhang et al.

(10) Patent No.: US 11,646,683 B1
(45) Date of Patent: May 9, 2023

(54) METHOD FOR SPEED ESTIMATION, ELECTRONIC DEVICE AND STORAGE MEDIUM

(71) Applicant: Hunan Megmeet Electrical Technology Co.,Ltd, Changsha (CN)

(72) Inventors: Qing Zhang, Surrey (CA); Yun Gao, Changsha (CN)

(73) Assignee: HUNAN MEGMEET ELECTRICAL TECHNOLOGY CO., LTD, Changsha (CN)

( * ) Notice: Subject to any disclaimer, the term of this patent is extended or adjusted under 35 U.S.C. 154(b) by 0 days.

(21) Appl. No.: 17/557,193

(22) Filed: Dec. 21, 2021

(30) Foreign Application Priority Data

Oct. 15, 2021 (CN) .......................... 202111205381.3

(51) Int. Cl.
*H02P 6/17* (2016.01)
*H02P 6/182* (2016.01)

(52) U.S. Cl.
CPC ................ *H02P 6/17* (2016.02); *H02P 6/182* (2013.01); *H02P 2207/05* (2013.01)

(58) Field of Classification Search
CPC .................................. H02P 6/17; H02P 6/182
USPC .................. 318/400.34, 400.32, 400.01, 700
See application file for complete search history.

(56) References Cited

U.S. PATENT DOCUMENTS

| | | | |
|---|---|---|---|
| 8,471,511 B2 * | 6/2013 | Kitagawa | H02P 6/182 347/17 |
| 8,823,299 B2 * | 9/2014 | Yang | H02P 6/182 318/599 |
| 9,941,824 B2 * | 4/2018 | Suzuki | A01D 69/02 |

* cited by examiner

*Primary Examiner* — David Luo
(74) *Attorney, Agent, or Firm* — IPro, PLLC

(57) ABSTRACT

The present application provides a method for speed estimation, device, electronic device, and storage medium, and relates to the technical field of rotational speed estimation. The method for speed estimation is applied to a three-phase brushless motor: firstly, acquire voltages of three terminals of a three-phase brushless motor; secondly, take the voltage difference value of each two terminals as an equivalent line voltage; thirdly, determine a virtual Hall signal according to a zero-crossing point of the equivalent line voltage; and lastly, estimate the rotational speed of the three-phase brushless motor according to the virtual Hall signal. The method for speed estimation, device, electronic device, and storage medium provided in the present application have the advantage of being simpler for rotational speed estimation.

19 Claims, 13 Drawing Sheets

METHOD FOR SPEED ESTIMATION, ELECTRONIC DEVICE AND STORAGE MEDIUM

TECHNICAL FIELD

The present application relates to the technical field of rotational speed estimation of three phase Brushless Direct Current motors, and in particular to a method for speed estimation, electronic device, and storage medium.

BACKGROUND

Currently, the traditional brushless direct current motor driver and control are typically implemented via one three-phase inverter, built-in three Hall-effect position sensors, and/or external optical-electricity encoders. These Hall sensors generate appropriate signals for current commutation, while the optical-electricity encoder signals or Hall signals provide motor position, rotational speed estimation, and control signal.

However, on the one hand, the way of adding a Hall sensor results in an increase in the cost of the motor and a relative decrease in the reliability. On the other hand, the hall sensor is sensitive to temperature and therefore limits the operation of the motor.

SUMMARY

In a first aspect, the embodiment of the present application provides a method for speed estimation. The method includes acquiring voltages of three terminals of the three-phase brushless motor; taking a voltage difference value of each two terminals as an equivalent line voltage; determining a virtual Hall signal according to a zero-crossing point of the equivalent line voltage; and estimating the rotational speed of the three-phase brushless motor according to the virtual Hall signal.

In a second aspect, the embodiment of the present application provides an electronic device. The electronic device includes a memory storing computer programs and a processor coupled to the memory; wherein execution of the computer programs by the processor, causes the processor to acquire voltages of three terminals of a three-phase brushless motor; take a voltage difference value of each two terminals as an equivalent line voltage; determine a virtual Hall signal according to a zero-crossing point of the equivalent line voltage; estimate the rotational speed of the three-phase brushless motor according to the virtual Hall signal.

In a third aspect, the embodiment of the present application further provides one or more non-volatile, machine-readable storage media. The storage media includes a plurality of instructions stored thereon that, when executed, cause a processor to acquire voltages of three terminals of a three-phase brushless motor; take a voltage difference value of each two terminals as an equivalent line voltage; determine a virtual Hall signal according to a zero-crossing point of the equivalent line voltage; estimate the rotational speed of the three-phase brushless motor according to the virtual Hall signal.

In order to make the above-mentioned object, features, and advantages of the present application more obvious and understandable, the following is a detailed description of the preferred embodiments in conjunction with the accompanying drawings.

BRIEF DESCRIPTION OF THE DRAWINGS

In order to more clearly illustrate the technical solutions of the embodiments of the present application, a brief description will be given below of the accompanying drawings which are required to be used in the embodiments. It is to be understood that the following drawings illustrate only some embodiments of the present application and are therefore not to be considered as limiting the scope. For ordinary technical personnel in this field, other relevant drawings can also be obtained according to these drawings without involving any inventive effort.

Figure 1:
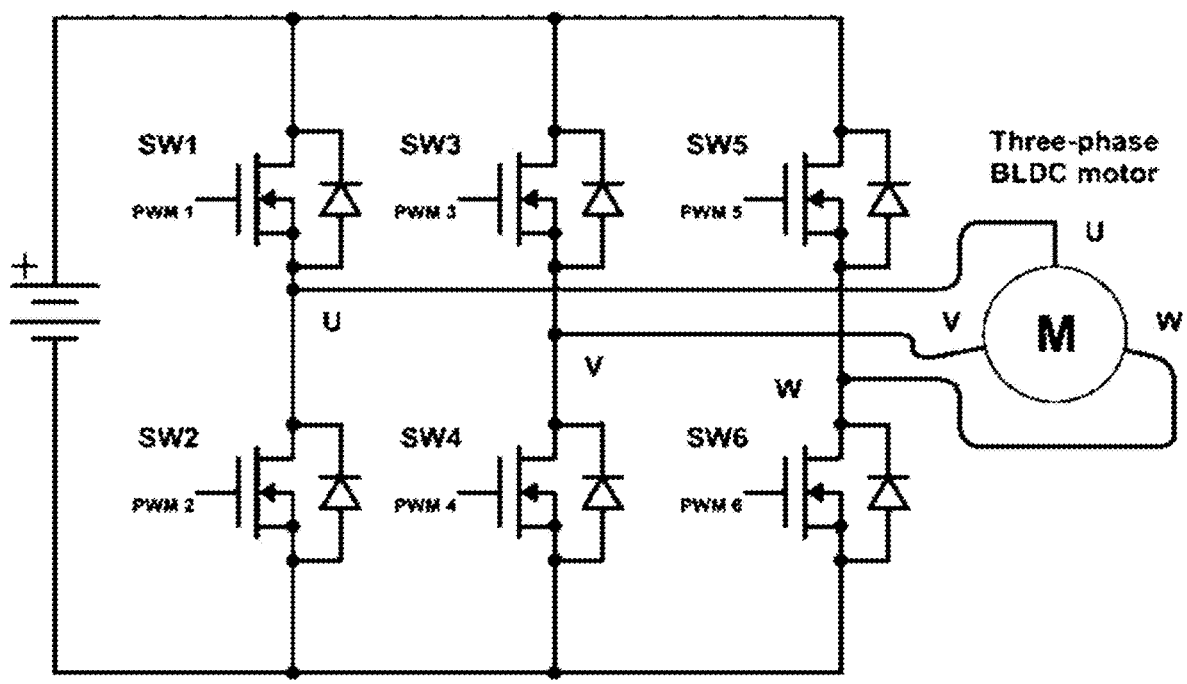
FIG. 1 is a schematic and topological diagram of a drive circuit of a three-phase brushless direct current motor provided by an embodiment of the present application.

The reference number in the drawings describes as follow: 100—electronic device; 101—processor; 102—memory; 103—communication interface; 200—rotational speed estimation device; 210—data acquisition unit; 220—data equivalent unit; 230—signal determining unit; and 240—rotational speed estimation unit.

DETAILED DESCRIPTION OF ILLUSTRATIVE EMBODIMENTS

To make the object, technical solution, and advantage of the embodiments of the present application clearer, the technical solution in the embodiments of the present application will be clearly and completely described below in conjunction with the accompanying drawings in the embodiments of the present application. Obviously, the described embodiments are only a part of the embodiments of the present application, rather than all the embodiments. The assembly of the embodiments of the present application, which are generally described and illustrated in the drawings herein, may be arranged and designed in a variety of different configurations.

Therefore, the following detailed description of the embodiments of the present application provided in the accompanying drawings is not intended to limit the scope of the claimed application, but is merely representative of selected embodiments of the application. Based on the embodiments of the present application, all other embodiments obtained by ordinary technical personnel in this field without involving any inventive efforts are within the scope of the present application.

It should be noted that: the same numbers and letters refer to same items in the following figures, and therefore, once a certain item is defined in one figure, it need not be further defined and explained in the following figures. Meanwhile, in the description of the present application, the terms "first", "second", and the like are only used to distinguish the description only and are not to be construed as indicating or implying relative importance.

Some embodiments according to the present application will be described in detail below with reference to the drawings. It should be noted that the embodiments and features in the embodiments may be combined with one another without conflicts.

In the present three-phase brushless direct current motor, it is necessary to use a Hall sensor to realize the rotational speed estimation and control. However, on the one hand, the way of adding a Hall sensor results in an increase in the cost of the motor and a relative decrease in the reliability. On the other hand, the Hall sensor is sensitive to temperature and therefore limits the operation of the motor.

Figure 2:
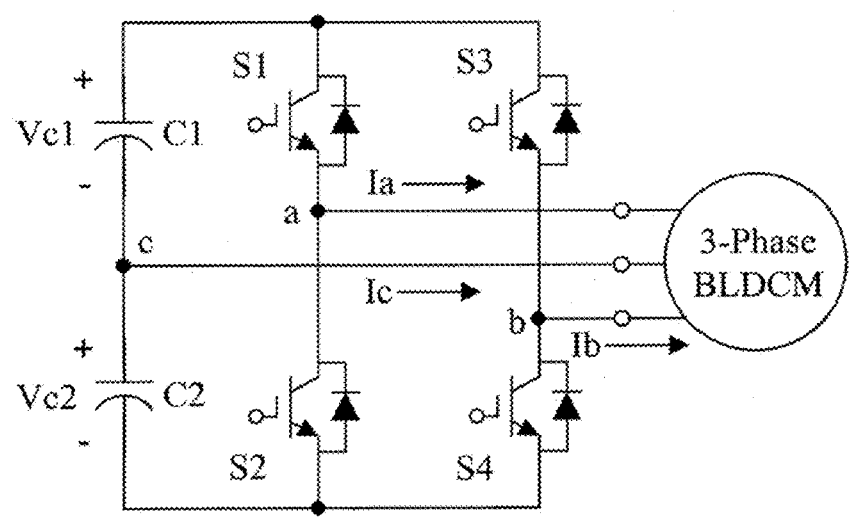
FIG. 2 is another schematic and topological diagram of a drive circuit of a three-phase brushless direct current motor provided by an embodiment of the present application.

The existing drive circuit of a three-phase Brushless direct current motor generally includes two topological structures, wherein the topological structure shown in FIG. 1 is a six-switch three-phase full-bridge inverter drive topology, and FIG. 2 shows a four-switch three-phase full-bridge inverter drive topology.

Figure 3:
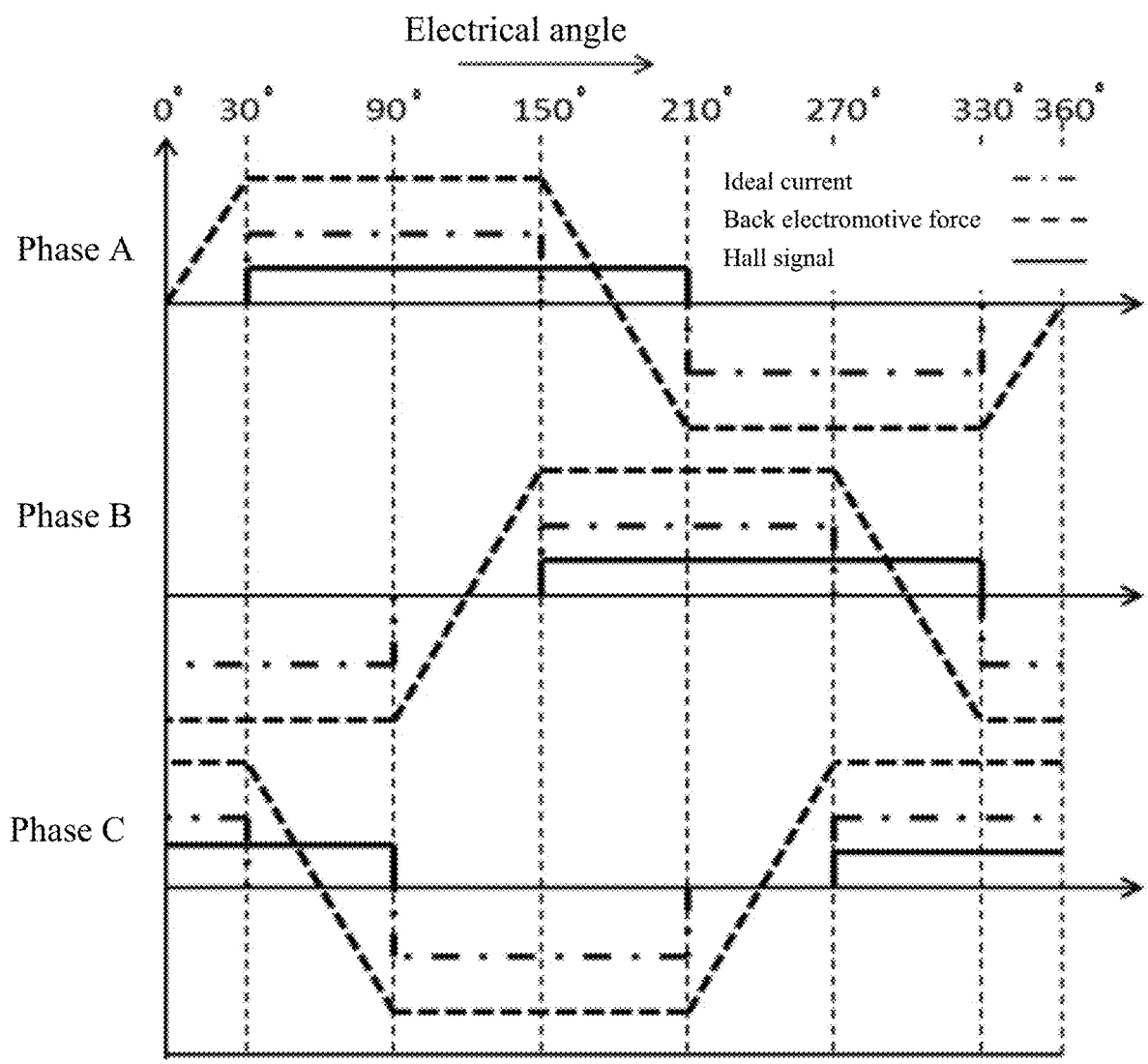
FIG. 3 is an illustration of Hall signals and circuit waveforms provided by an embodiment of the present application.

Regardless of which drive topology structure is used, a six-step commutation control technique is used to drive a brushless direct current motor. When the brushless direct current motor with a Hall sensor is operating, the timing sequence of the ideal back electromotive force, Hall signal and current waveform are shown in FIG. 3.

The commutation of the brushless direct current motor is electronically controlled. To rotate the brushless direct current motor, the stator windings should be energized in sequence. If three Hall sensors are used for control, they need to be embedded in the stator at the non-driving end of the motor. The rotor position is sensed by a Hall effect sensor embedded in the stator to give a phase sequence. Whenever a rotor magnetic pole passes near the Hall sensor, the Hall sensor emits a high/low signal indicating that an N or S pole is passing near the sensor. Based on the combination of signals of the three Hall sensor, an accurate commutation sequence can be determined. The signal commutation sequence of the six-step Hall sensor is shown in Table 1 below:

TABLE 1

| Hall sensor A | Hall sensor B | Hall sensor C | Phase A | Phase B | Phase C |
|---|---|---|---|---|---|
| 0 | 1 | 0 | −VDC | +VDC | NC |
| 1 | 1 | 0 | NC | +VDC | −VDC |
| 1 | 0 | 0 | +VDC | NC | −VDC |
| 1 | 0 | 1 | +VDC | −VDC | NC |
| 0 | 0 | 1 | NC | −VDC | +VDC |
| 0 | 1 | 1 | −VDC | NC | +VDC |

Where +VDC represents a direct current high level, −VDC represents a low level, and NC represents Not Connected, i. e. suspended floating. It can be seen that each driving stage consists of one motor terminal being connected to a high level, one motor terminal being connected to a low level, and one motor terminal being suspended. In other words, in each commutation sequence, one winding is energized with positive power (the current enters the winding), the other winding is energized with negative power (the current flows out of the winding), and the third winding is in a non-energized state. It can be seen therefrom that the Hall sensor signal plays an important role in the drive control of the brushless direct current motor.

However, due to the problems of cost, reliability and temperature sensitivity, etc. of the Hall sensor, it is necessary to find a way to replace the Hall sensor.

Figure 4:
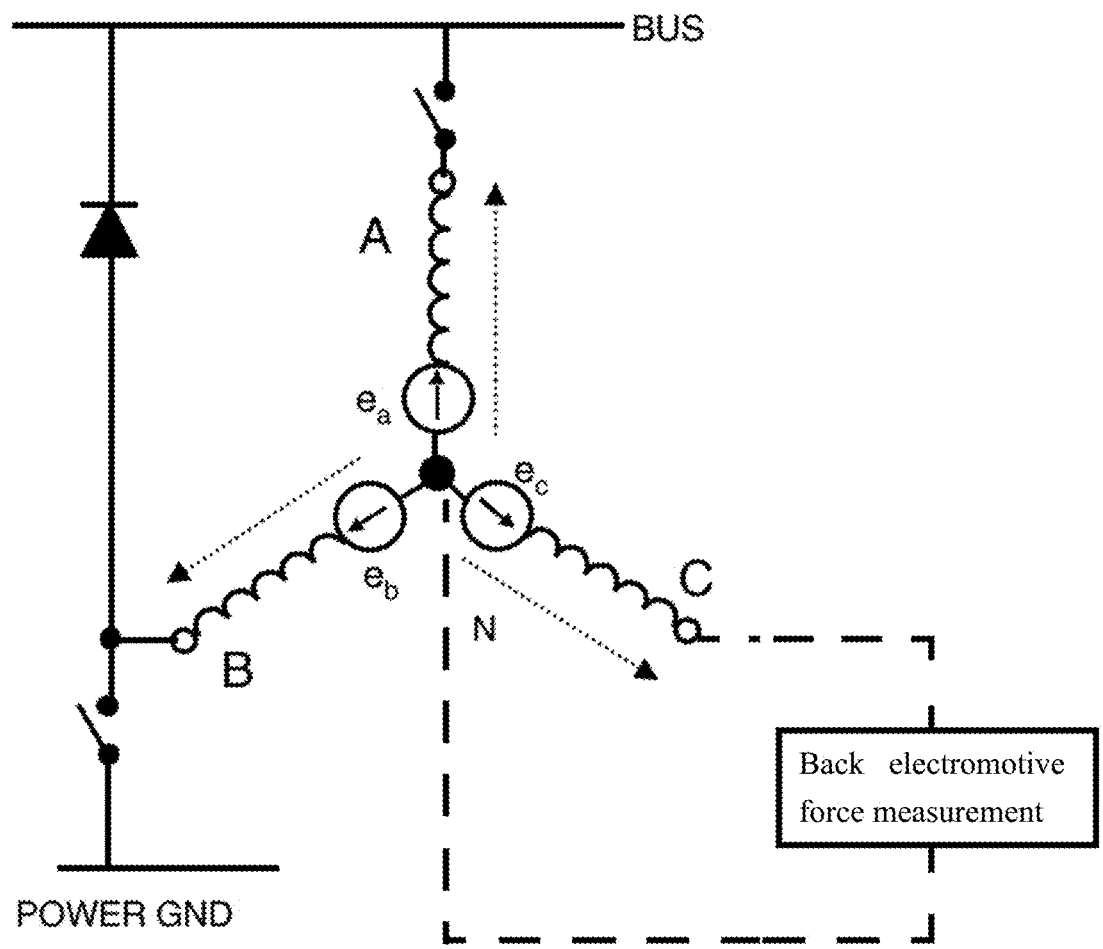
FIG. 4 is a block diagram of an equivalent measurement of back electromotive force provided by an embodiment of the present application.

Without the Hall element as a position sensor, the brushless direct current motor drive would construct a virtual Hall signal to achieve commutation control and rotational speed estimation based on back electromotive force (BEMF) zero-cross detection from the motor terminal voltage caused by permanent magnet rotor motion in front of the stator winding. Considering a brushless direct current motor with three stator phase windings having star connection, when the motor is working, only the voltage between the terminal and the star neutral point measured when the motor terminal is suspended (non-conducting) is the real back electromotive force. For the six-step commutation control technique, each stage forces the corresponding terminal to be zero current twice during the six steps, which allows the detection and reading of the back electromotive force zero-crossing point. The detection circuit is shown in FIG. 4. It is to be understood that the detection circuit may detect the zero-crossing point of phase C. Of course, the same detection circuit may be provided for phase A and phase B, which will not be described in detail herein.

Therein, for each step of the six-step commutation control technique, one phase of the motor is not energized, which allows the detection of a back electromotive force zero-crossing point in the phase. In addition, for each phase, two zero-crossing points must be detected within a period of time.

The two zero-crossing points includes: a "rising crossover point" when the back electromotive force changes from a negative value to a positive value, and a "falling crossover point" when the back electromotive force changes from a positive value to a negative value.

Figure 5:
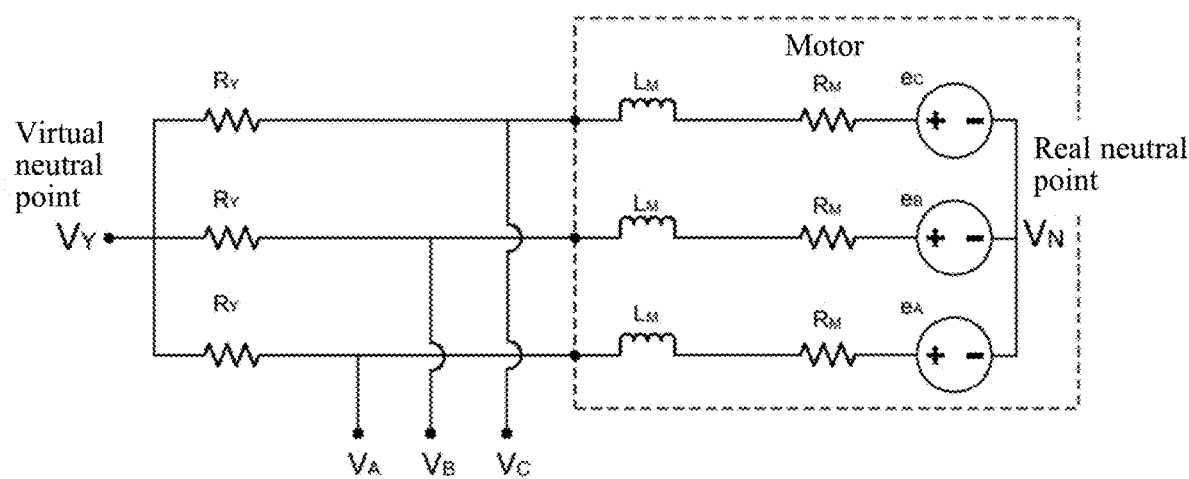
FIG. 5 is a block diagram of a circuit for constructing a virtual neutral point provided by an embodiment of the present application.

This solution requires a motor neutral point voltage to obtain a zero-cross of the back electromotive force in that the back electromotive force voltage refers to the motor neutral point. By comparing the terminal voltage with the neutral point, the zero-cross of the back electromotive force can be obtained. In most cases, the motor neutral point is not available. In practice, the most common method is to make a virtual neutral point, which is theoretically at the same potential as the center of the star-wound motor, and then sense the voltage between the virtual neutral point and the suspended terminal to obtain the back electromotive force. The virtual neutral point is generally constructed by a resistor, as shown in FIG. 5, where $R_Y$ is the constructed resistor. Obviously, this way leads to an increase in hardware circuit, a relatively complicated circuit structure, and an increase in cost.

Furthermore, since the signal directly obtained through the zero-cross detection of the back electromotive force (BEMF) is not completely consistent with the real Hall signal, there is an electrical angle phase difference of 30°.

Figure 6:
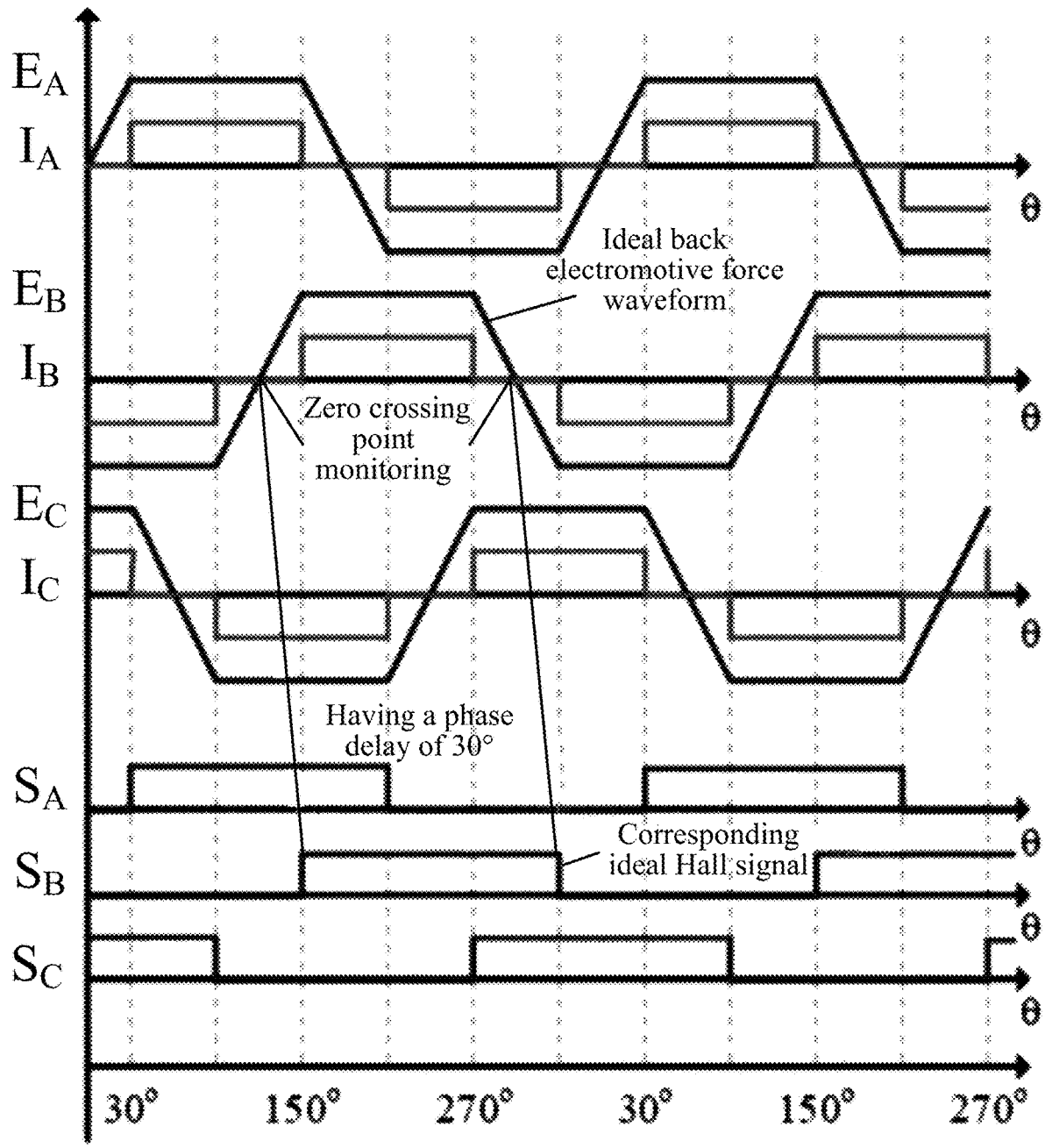
FIG. 6 is a waveform diagram of back electromotive force versus an ideal Hall signal provided by an embodiment of the present application.

Therefore, these existing technologies also need to use filtering, time delay, or integration plus a threshold value, etc. to compensate for the electrical angle phase difference of 30°. As shown in FIG. 6, marks of $E_A$, $E_B$, and $E_C$ represent the back electromotive forces, and $S_A$, $S_B$, and $S_C$ represent the ideal Hall signals. It can be seen that the back electromotive force has an electrical angle phase difference of 30° with the rising edge and the falling edge of the ideal Hall signal. The estimation of the rotational speed is relatively complex.

In view of this, the present application provides a method for speed estimation, which makes the method for speed estimation simpler by synthesizing a new signal using voltages of three terminals and determining a virtual Hall signal according to the new synthesized signal.

It should be noted that the method provided in the present application can be applied to electronic device. For example, the electronic device can be a three-phase brushless motor, or the electronic device can be independent of the three-phase brushless motor, and is not limited thereto.

Figure 7:
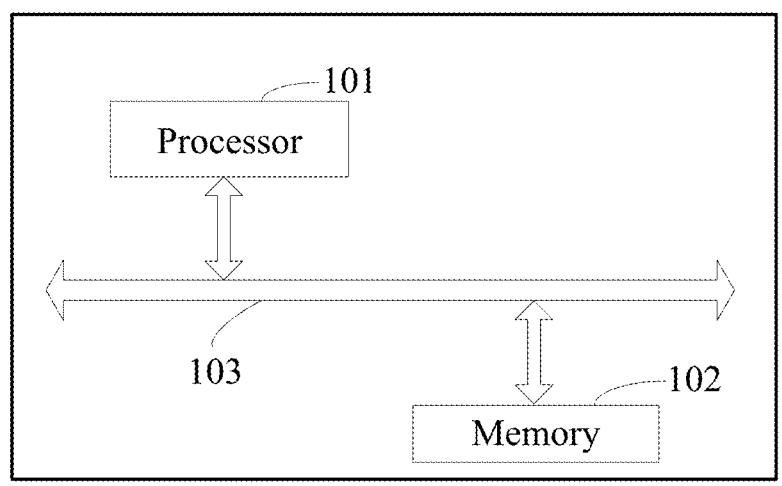
FIG. 7 is a block diagram of a module of electronic device provided by an embodiment of the present application.

FIG. 7 shows a schematic structural block diagram of electronic device 100 provided by an embodiment of the present application. The electronic device 100 includes a memory 102, a processor 101, and a communication interface 103. The memory 102, the processor 101 and the communication interface 103 are electrically connected to each other directly or indirectly for data transmission or interaction. For example, the elements may be electrically connected to each other via one or more communication buses or signal lines.

The memory 102 can be used to store software programs and modules, such as program instructions or modules corresponding to the rotational speed estimation device provided in the embodiment of the present application. The processor 101 executes various functional applications and data processing by executing software programs and modules stored in the memory 102, and then executes the steps of the method for estimating the rotation speed provided in the embodiment of the present application. The communication interface 103 may be used for signaling or data communication with other node equipment.

The memory 102 may be, but is not limited to, a Random Access Memory (RAM), a Read Only Memory (ROM), a Programmable Read-Only Memory (PROM), an Erasable Programmable Read-Only Memory (EPROM), an Electric Erasable Programmable Read-Only Memory (EEPROM), etc.

The processor 101 may be an integrated circuit chip with signal processing capabilities. The processor 101 may be a general-purpose processor, including a Central Processing Unit (CPU), a Network Processor (NP), etc. The processor 101 may also be Digital Signal Processing (DSP), Application Specific Integrated Circuit (ASIC), Field-Programmable Gate Array (FPGA) or other programmable logic devices, discrete gate or transistor logic devices and discrete hardware assemblies.

It will be appreciated that the structure shown in FIG. 7 is merely illustrative and that the electronic device 100 may also include more or fewer assemblies than shown in FIG. 7 or have a different configuration from that shown in FIG. 7. The assemblies shown in FIG. 7 may be implemented in hardware, software, or a combination thereof.

The method for speed estimation provided in the embodiment of the present application is exemplified as follows.

Figure 8:
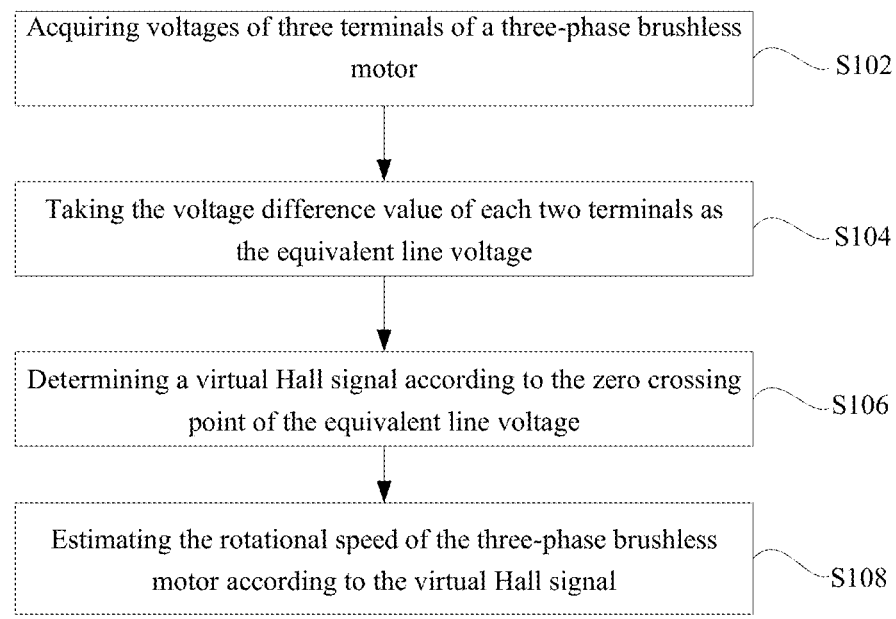
FIG. 8 is an exemplary flowchart of a method for speed estimation provided by an embodiment of the present application.

In some embodiments, referring to FIG. 8, the method for speed estimation includes the following steps.

S102, acquiring voltages of three terminals of a three-phase brushless motor.

S104, calculating the voltage difference value of each two terminals as the equivalent line voltage.

S106, determining a virtual Hall signal according to a zero-crossing point of the equivalent line voltage.

S108, estimating the rotational speed of the three-phase brushless motor according to the virtual Hall signal.

After acquiring the voltages of three terminals, the present application does not directly use the voltages of the three terminals to perform zero-cross detection, but performs difference value processing on the voltages of the three terminals. On the one hand, after such difference value processing, the zero-sequence voltage component in the equivalent line voltage disappears, and the left is mainly a new signal synthesized by the back electromotive force. On the other hand, the zero-crossing point of the new equivalent line voltage and the zero-crossing point of the ideal back electromotive force have an electrical angle phase difference of just 30°, and the equivalent line voltage is synchronized with the rising edge and the falling edge of the ideal Hall signal to achieve phase consistency. There is no need to perform filtering, time delay, or integration plus a threshold value and like methods for compensation, so that the assessment of the rotational speed of the motor is simpler.

In some embodiments, a three-phase brushless motor includes three voltage measuring circuits, wherein each voltage measuring circuit is connected to one terminal of the three-phase brushless motor. The test reference point of the three voltage measuring circuits is an arbitrary point. The step of S102 includes acquiring voltages of the three terminals by three voltage measuring circuits, respectively.

Figure 9:
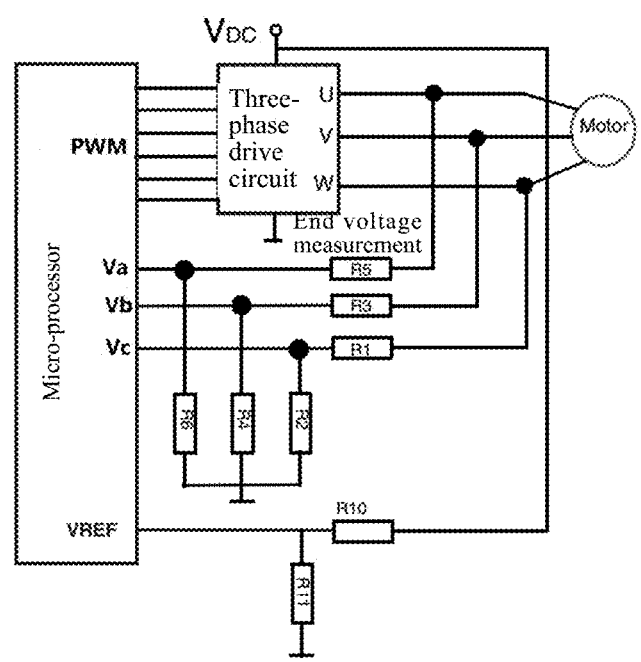
FIG. 9 is a block diagram of a voltage measurement circuit provided by an embodiment of the present application.

It should be noted that, as shown in FIG. 9, when it is required to acquire the voltage of the terminal, namely, acquiring the voltages of Va, Vb, and Vc, three voltage measuring circuits can be provided. The voltage measuring circuits can be voltage divider circuits, for example, R5 and R6 shown in FIG. 9 constituting one voltage divider circuit. The electronic device can further include a microprocessor, and the voltage can be acquired via the microprocessor to realize the measurement of the terminal voltage.

Since the present application does not directly use the back electromotive force to determine the virtual Hall signal, but first determines the equivalent line voltage, and then uses the equivalent line voltage to determine the virtual Hall signal. For instance, the synthesis of the equivalent line voltage only requires the corresponding difference value of the back electromotive force, and thus virtual neutral point constructed previously is not actually required to measure the real back electromotive force voltage. The voltages of the three terminals of the three-phase brushless direct current motor can be sensed with any reference point and then the difference value thereof is calculated by the software, so that the complexity of hardware can be reduced and the cost can be reduced.

As shown in FIG. 9, the combining node below R2, R4, and R6 is a reference point, and the point can be any voltage.

In an alternative embodiment, the three-phase brushless motor includes two voltage measuring circuits. The two voltage measuring circuits are respectively connected to two terminals of the three-phase brushless motor, and a test reference point of the two voltage measuring circuits is connected to the third terminal. Namely, when the reference point is selected at the terminal of a certain phase of the motor, the voltage of this phase is zero. According to the analysis of the six-step commutation control technology, it is possible to measure only the voltage of two motor ends and use the formula to calculate the voltage difference value. In this way it is still possible to obtain the zero-crossing points of the desired three synthesized signals and acquire virtual Hall signals. On this basis, the step of S102 includes:

S1021, respectively acquiring voltages of two terminals via two voltage measuring circuits.

S1022, determining the voltage of the third terminal according to the voltages of the two terminals and a preset balance relationship.

In some embodiments, the equivalent line voltage satisfies the formula:

$$E_{AC}=E_A-E_C$$

$$E_{BA}=E_B-E_A$$

$$E_{CB}=E_C-E_B$$

Where $E_A$, $E_B$, and $E_C$ represent the voltage of three terminals of the three-phase brushless motor, and $E_{AC}$, $E_{BA}$, and $E_{CB}$ represent the equivalent line voltage.

Figure 10:
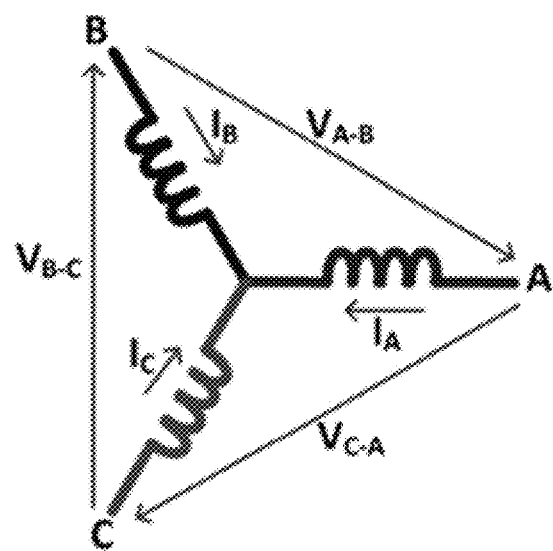
FIG. 10 is a phasor diagram of a three-phase voltage provided by an embodiment of the present application.

Referring to FIG. 10, which shows a phasor diagram of three-phase voltage, it can be seen that $V_{CA}$, $V_{AB}$, and $V_{bc}$ lag 30° from the corresponding phase voltages $V_A$, $V_B$, and $V_C$, respectively. Therefore, if the three measured back electromotive forces $E_A$, $E_B$ and $E_C$ are considered as three-phase phase voltages, the corresponding synthesized voltages $E_{AC}=E_A-E_C$, $E_{BA}=E_B-E_A$ and $E_{CB}=E_C-E_B$ are equivalent line voltages. By determining the virtual Hall signal through the zero-crossing point of the equivalent line voltage, it is possible to measure the real back electromotive force voltage without the virtual neutral point constructed previously. The voltages of three terminals of the three-phase brushless direct current motor can be sensed with any reference point and then their difference values can be calculated with software. In this case the complexity of hardware can be reduced and the cost can be reduced.

Meanwhile, the zero-crossing points include a first zero-crossing point from negative to positive and a second zero-crossing point from positive to negative. The step of S108 for determining the Hall signal further includes:

S1081, when the first zero-crossing point is occurred, set the variable signal to be 1.

S1082, when the second zero-crossing point is occurred, set the variable signal to be 0.

S1083, integrating the variable signals to determine a virtual Hall signal.

That is, one new variable signal is constructed that sets "1" when a zero-crossing point from "negative" to "positive" is detected and sets "0" when a zero-crossing point from "positive" to "negative" is detected. In this way, the new variable signal is just synchronized (in phase) with the rising edge and falling edge of the ideal Hall signal, and the new variable signal is integrated as a virtual Hall signal.

Figure 11:
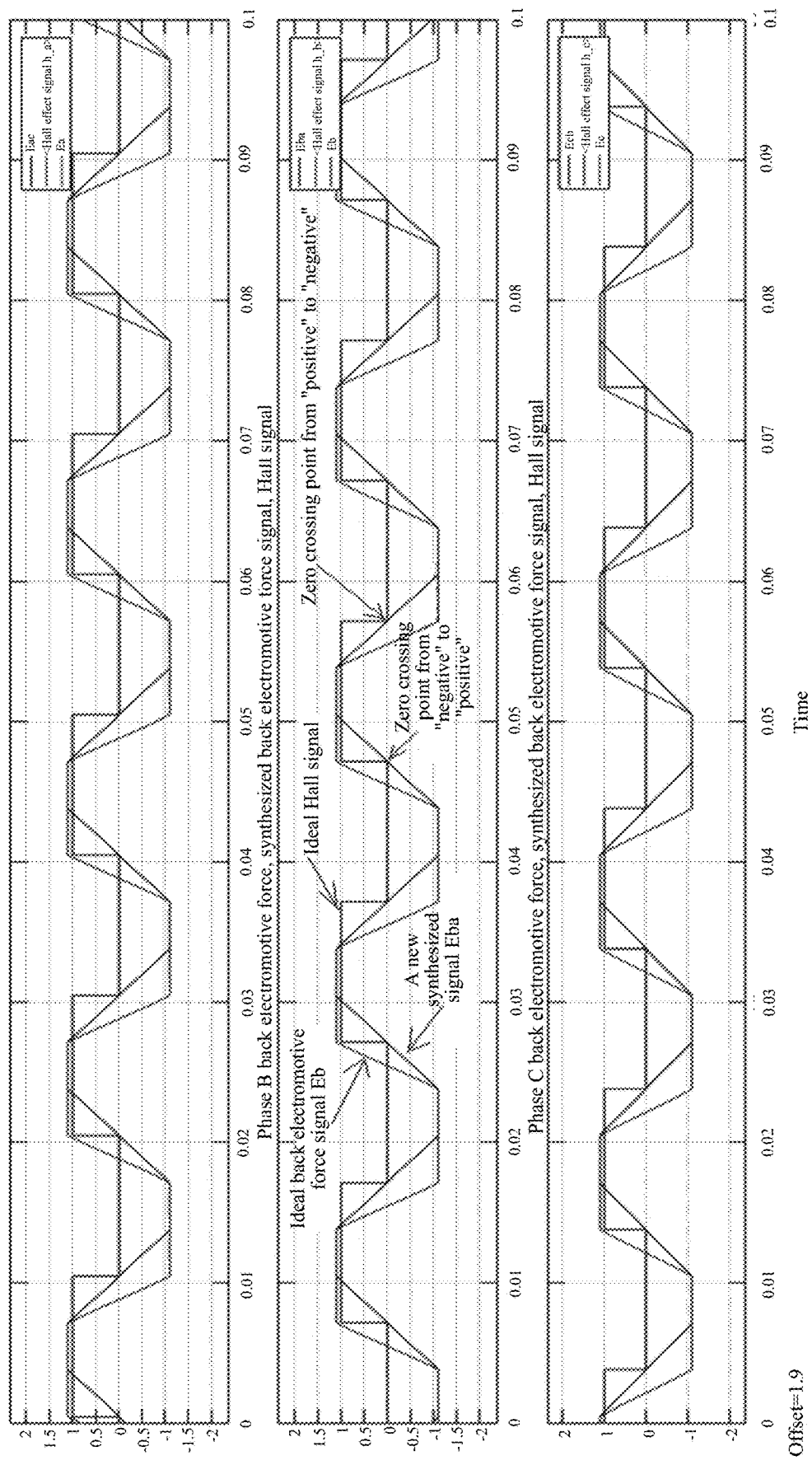
FIG. 11 is a waveform diagram of an equivalent line voltage versus an ideal Hall signal provided by an embodiment of the present application.

FIG. 11 shows waveforms of the equivalent line voltage and the ideal Hall signal. In the drawing, the ideal back electromotive force signal refers to the back electromotive force obtained by sensing the voltage between the virtual neutral point and the floating terminal, and the new synthesized signal refers to the equivalent line voltage, and the ideal Hall signal refers to the accurate Hall signal detected by the real Hall sensor in the motor when operating. It can be seen that the zero-crossing point of the equivalent line voltage is consistent with the rising edge and the falling edge of the ideal Hall signal. Therefore, the virtual Hall signal determined according to the zero-crossing point of the equivalent line voltage can be equivalent to the ideal Hall signal in realizing the function of rotational speed estimation.

When using a virtual Hall signal to estimate the rotational speed of a three-phase brushless motor, the number of the virtual Hall signals is three. In some embodiments, the step of S108 includes:

S1081, acquiring a synthesized signal by the XOR operation of the three virtual Hall signals.

S1082, estimating the rotational speed of a three-phase brushless motor according to the synthesized signal.

Figure 12:
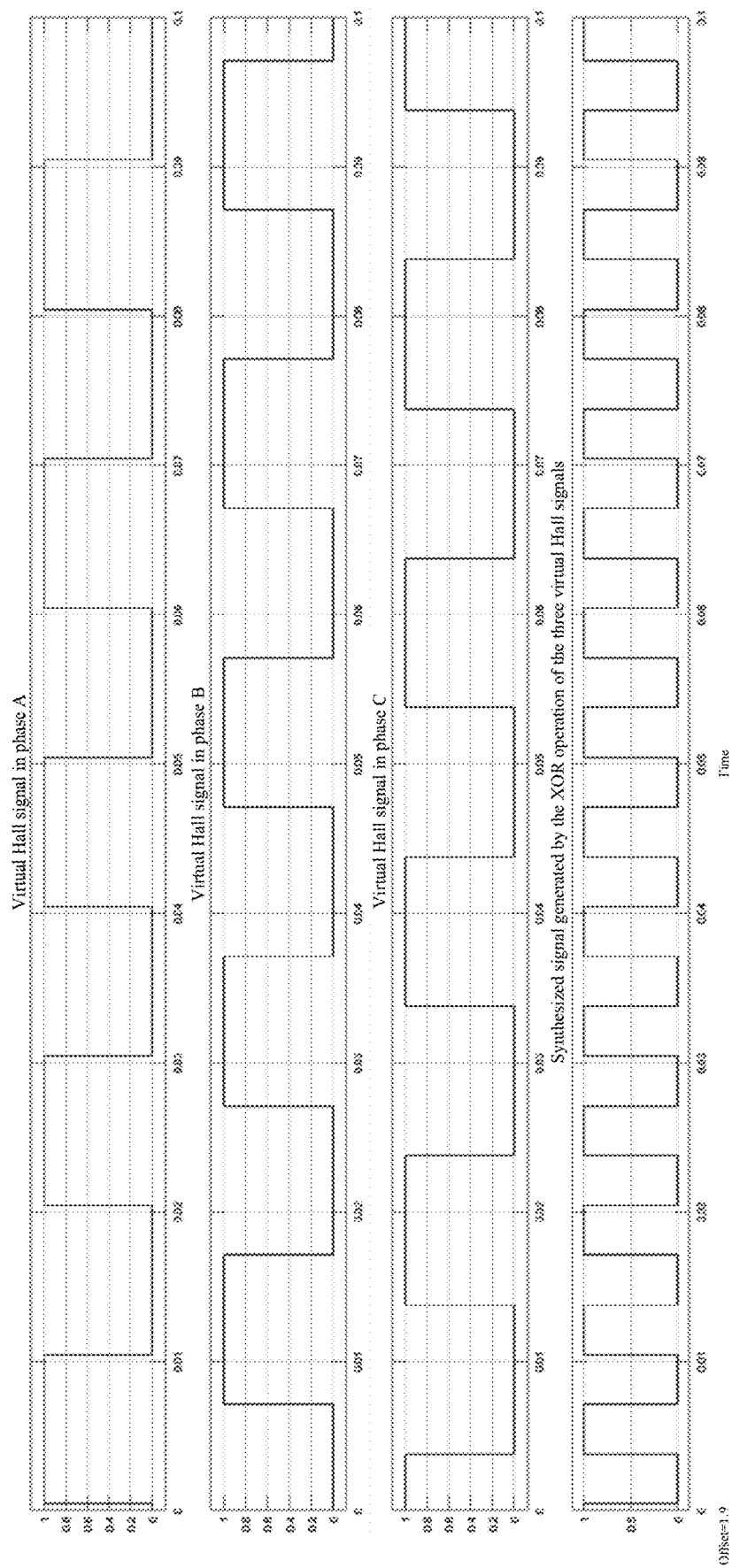
FIG. 12 is a waveform diagram of a synthesized signal and Hall signal provided by an embodiment of the present application.

Referring to FIG. 12, it can be seen that the frequency of the synthesized signal is three times the frequency of a single Hall signal. Accordingly, the detection speed of the method will be three times that of the original and more accurate, when the new synthesized signal is used to estimate the rotational speed of the motor by adopting the same method mentioned above.

In some embodiments, the rotational speed of a three-phase brushless motor satisfies the formula:

$$N=20*F/P=20/(T*P)$$

where N represents the rotational speed of the three-phase brushless motor, F represents the frequency of the virtual Hall signal, P represents the number of magnetic pole pairs, and T represents the period of the virtual Hall signal. It should be noted that the number of pole pairs is the number of magnetic poles contained in each phase of the motor. The number of pole pairs of the motor directly affects the rotational speed of the motor. The definition of the number of poles of the motor has the same meaning as the number of pole pairs of the motor. The number of poles of the motor is the number of magnetic poles of the motor, and the magnetic poles are divided into N poles and S poles. Generally, the number of magnetic poles appears in pairs, such as a 2-pole motor, a 4-pole motor, a 6-pole motor, etc. One N pole and one S pole are referred to as a pair of poles, namely, the number of pole pairs is 1.

Figure 13:
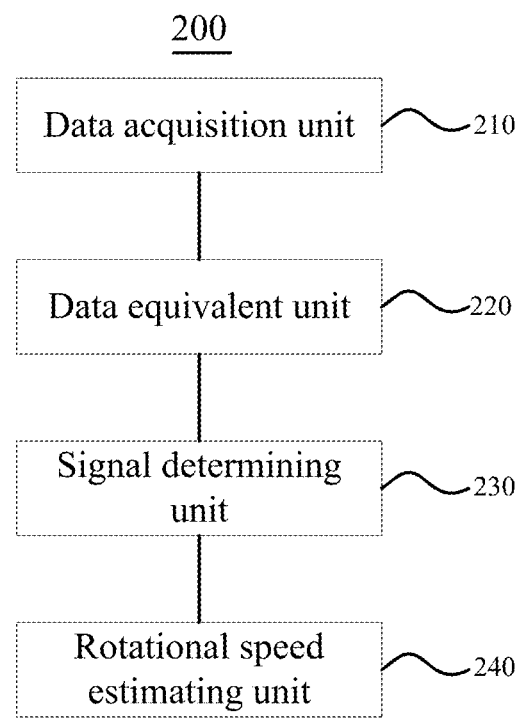
FIG. 13 is a block diagram of a module of a voltage measurement device provided by an embodiment of the present application.

Based on the above-mentioned embodiments, the present application also provides a rotational speed estimating device applied to a three-phase brushless motor. With reference to FIG. 13, the rotational speed estimating device 200 includes: a data acquisition unit 210 for acquiring voltages of three terminals of the three-phase brushless motor; and a data equivalent unit 220 for taking the voltage difference value of each two terminals as the equivalent line voltage; and a signal determining unit 230 for determining the virtual Hall signal according to the zero-crossing point of the equivalent line voltage and a rotational speed estimating unit 240 for estimating the rotational speed of the three-phase brushless motor according to the virtual Hall signal.

It could be understood that S102 may be executed via the data acquisition unit 210; S104 may be executed by the data equivalent unit 220; S106 may be executed by the signal determining unit 230; S108 may be executed by the rotational speed estimation unit 240.

In addition, each step in the above-mentioned embodiments may has a corresponding functional module to be executed. Since the above-mentioned embodiments have been described in detail, the description of the functional module will not be repeated here.

In summary, the present application provides a method for speed estimation, electronic device, and storage medium. The method for speed estimation is applied to the three-phase brushless motor. Firstly, acquire voltages of three terminals of the three-phase brushless motor. Secondly, calculate the voltage difference value of each two terminals as an equivalent line voltage. Thirdly, determine a virtual Hall signal according to a zero-crossing point of the equivalent line voltage. And finally estimate the rotational speed of the three-phase brushless motor according to the virtual Hall signal. By taking the voltage difference value of each two terminals as the equivalent line voltage, the zero-crossing point of the equivalent line voltage has an electrical angle phase difference of 30° with the zero-crossing point determined by the traditional back electromotive force. So, the phase of the virtual Hall signal determined via the zero-crossing point of the equivalent line voltage is consistent with the phase of the ideal Hall signal. And thus, there is no need to use filtering, time delay, or integration plus a threshold value and like methods to compensate the electrical angle phase difference. this rotational speed estimation is simpler.

In the embodiments provided herein, it should be understood that the disclosed device and method may be implemented in other ways. The device embodiment described above is merely exemplary. For example, the flowcharts and block diagrams in the drawings show the possibly implemented architectures, functions, and operations of the device, method, and computer program product according to the embodiments of the present application. In this regard, each block in the flowchart or block diagram may represent one module, program segment, or a portion of the code, which contains one or more executable instructions for implementing the specified logical function.

It should also be noted that in some alternative embodiments, the functions noted in the blocks may change the order noted in the figures. For example, two successive blocks may in fact be executed substantially in parallel, or they may sometimes be executed in the reverse order, depending upon the functionality involved.

It should also be noted that each block in the block diagram and/or flowchart, and the combination of the block in the block diagram and/or flowchart, can be implemented by a dedicated hardware-based system that executes the specified function or action, or can be realized by a combination of dedicated hardware and computer instructions.

In addition, each functional module in the embodiments of the present application may be integrated together to form a separate portion, or each module may exist separately, or two or more modules may be integrated to form one independent portion.

The functions, if implemented in the form of software functional modules and sold or used as independent products, may be stored in one computer-readable storage medium. Based on such an understanding, the technical solution of the present application can be embodied in the form of a software product in essence or in the part that contributes to the existing technique or in a part of the technical solution. The computer software product is stored in one storage medium and includes several instructions to make one computer equipment (which may be a personal computer, a server, or network equipment, etc.) execute all or part of the steps of the method described in the embodiments of the present application. The above-mentioned storage medium includes various media that may store the program code, such as a U-disk, mobile hard disk, read-only memory, random access memory, diskette or optical disk, and the like.

Although the present invention is disclosed above, the present invention is not limited thereto. Any person skilled in this field can make various changes and modifications without departing from the essence and scope of the present invention. Therefore, the protection scope of the present invention should be subject to the scope defined by the claims.

What is claimed is:

1. A method for speed estimation comprising:
   acquiring voltages of three terminals of a three-phase brushless motor;
   taking a voltage difference value of each two terminals as an equivalent line voltage, such that a zero-sequence voltage component in the equivalent line voltage disappears;
   determining a virtual Hall signal according to a zero-crossing point of the equivalent line voltage, wherein the equivalent line voltage is synchronized with a rising edge and a falling edge of an ideal Hall signal;
   estimating the rotational speed of the three-phase brushless motor according to the virtual Hall signal.

2. The method according to claim 1, wherein the equivalent line voltage satisfies a formula as follow:

$$E_{AC}=E_A-E_C$$

$$E_{BA}=E_B-E_A$$

$$E_{CB}=E_C-E_B$$

wherein $E_A$, $E_B$, and $E_C$ represent voltages of three terminals of the three-phase brushless motor, and $E_{AC}$ $E_{BA}$, and $E_{CB}$ and represent the equivalent line voltages.

3. The method according to claim 1, wherein the step of estimating the rotational speed of the three-phase brushless motor according to the virtual Hall signal comprises:
   generating a synthesized signal according to the XOR operation of the virtual Hall signals, wherein the number of the virtual Hall signals is three;
   estimating the rotational speed of the three-phase brushless motor according to the synthesized signal.

4. The method according to claim 3, wherein the rotational speed of the three-phase brushless motor satisfies a formula as follow:

$$N=20*F/P=20/(T*P)$$

wherein N represents the rotational speed of the three-phase brushless motor, F represents a frequency of the virtual Hall signal, P represents the number of magnetic pole pairs, and T represents a period of the virtual Hall signal.

5. The method according to claim 1, wherein the step of determining a virtual Hall signal according to a zero-crossing point of the equivalent line voltage further comprises;
   in response to a first zero-crossing point that is from negative to positive occurred, setting a variable signal to be 1;
   in response to a second zero-crossing point that is from positive to negative occurred, setting the variable signal to be 0;
   integrating the variable signals to determine the virtual Hall signal.

6. The method according to claim 1, wherein the step of acquiring voltages of three terminals of the three-phase brushless motor comprises:
   acquiring voltages of three terminals of the three-phase brushless motor by three voltage measuring circuits that each of the voltage measuring circuit is connected to one terminal of the three-phase brushless motor, respectively.

7. The method according to claim 1, wherein the step of acquiring voltages of three terminals of the three-phase brushless motor comprises:

acquiring voltages of two terminals of the three-phase brushless motor by two voltage measuring circuits that each of the voltage measuring circuit is connected to one terminal of the three-phase brushless motor, respectively;

determining the voltage of third terminal according to the voltages of the two terminals of the three-phase brushless motor and a preset balance relationship, wherein a test reference point of the two voltage measuring circuits is connected to the third terminal.

8. An electronic device, comprising:
a memory storing computer programs;
a processor coupled to the memory; wherein execution of the computer programs by the processor, causes the processor to:
acquire voltages of three terminals of a three-phase brushless motor;
take a voltage difference value of each two terminals as an equivalent line voltage;
determine a virtual Hall signal according to a zero-crossing point of the equivalent line voltage;
estimate the rotational speed of the three-phase brushless motor according to the virtual Hall signal;
wherein the step of estimating the rotational speed of the three-phase brushless motor according to the virtual Hall signal comprises:
generating a synthesized signal according to the XOR operation of the virtual Hall signals, wherein the number of the virtual Hall signals is three;
estimating the rotational speed of the three-phase brushless motor according to the synthesized signal.

9. The electronic device according to claim 8, wherein the equivalent line voltage satisfies a formula as follow:

$$E_{AC}=E_A-E_C$$

$$E_{BA}=E_B-E_A$$

$$E_{CB}=E_C-E_B$$

wherein $E_A$, $E_B$, and $E_C$ represent voltages of three terminals of the three-phase brushless motor, and $E_{AC}$, $E_{BA}$, and $E_{CB}$ represent the equivalent line voltage.

10. The electronic device according to claim 9, wherein the rotational speed of the three-phase brushless motor satisfies a formula as follow:

$$N=20*F/P=20/(T*P)$$

wherein N represents the rotational speed of the three-phase brushless motor, F represents a frequency of the virtual Hall signal, P represents the number of magnetic pole pairs, and T represents a period of the virtual Hall signal.

11. The electronic device according to claim 8, wherein the step of determining a virtual Hall signal according to a zero-crossing point of the equivalent line voltage further comprises:
in response to a first zero-crossing point that is from negative to positive occurred, setting a variable signal to be 1;
in response to a second zero-crossing point that is from positive to negative occurred, setting the variable signal to be 0;
integrating the variable signals to determine the virtual Hall signal.

12. The electronic device according to claim 8, wherein the step of acquiring voltages of three terminals of the three-phase brushless motor comprises:

acquiring voltages of three terminals of the three-phase brushless motor by three voltage measuring circuits that each of the voltage measuring circuit is connected to one terminal of the three-phase brushless motor, respectively.

13. The electronic device according to claim 8, wherein the step of acquiring voltages of three terminals of the three-phase brushless motor comprises:
acquiring voltages of two terminals of the three-phase brushless motor by two voltage measuring circuits that each of the voltage measuring circuit is connected to one terminal of the three-phase brushless motor, respectively;
determining the voltage of third terminal according to the voltages of the two terminals of the three-phase brushless motor and a preset balance relationship, wherein a test reference point of the two voltage measuring circuits is connected to the third terminal.

14. One or more non-volatile, machine-readable storage media comprising
a plurality of instructions stored thereon that, when executed, cause a processor to:
acquire voltages of three terminals of a three-phase brushless motor;
take a voltage difference value of each two terminals as an equivalent line voltage, wherein the equivalent line voltage is phase consistency with an ideal Hall signal;
determine a virtual Hall signal according to a zero-crossing point of the equivalent line voltage;
estimate the rotational speed of the three-phase brushless motor according to the virtual Hall signal.

15. The one or more non-volatile, machine-readable storage media according to claim 14, wherein the equivalent line voltage satisfies a formula as follow:

$$E_{AC}=E_A-E_C$$

$$E_{BA}=E_B-E_A$$

$$E_{CB}=E_C-E_B$$

wherein $E_A$, $E_B$, and $E_C$ represent voltages of three terminals of the three-phase brushless motor, and $E_{AC}$, $E_{BA}$, and $E_{CB}$ represent the equivalent line voltage.

16. The one or more non-volatile, machine-readable storage media according to claim 14, wherein the step of estimating the rotational speed of the three-phase brushless motor according to the virtual Hall signal comprises:
generating a synthesized signal according to the XOR operation of the virtual Hall signals, wherein the number of the virtual Hall signals is three;
estimating the rotational speed of the three-phase brushless motor according to the synthesized signal according the formula as follow:

$$N=20*F/P=20/(T*P)$$

wherein N represents the rotational speed of the three-phase brushless motor, F represents a frequency of the synthesized signal, P represents the number of magnetic pole pairs, and T represents a period of the virtual Hall signal.

17. The one or more non-volatile, machine-readable storage media according to claim 14, wherein the step of determining a virtual Hall signal according to a zero-crossing point of the equivalent line voltage further comprises:
in response to a first zero-crossing point that is from negative to positive occurred, setting a variable signal to be 1;

in response to a second zero-crossing point that is from positive to negative occurred, setting the variable signal to be 0;

integrating the variable signals to determine the virtual Hall signal.

18. The one or more non-volatile, machine-readable storage media according to claim 14, wherein the step of acquiring voltages of three terminals of the three-phase brushless motor comprises:

acquiring voltages of three terminals of the three-phase brushless motor by three voltage measuring circuits that each of the voltage measuring circuit is connected to one terminal of the three-phase brushless motor, respectively.

19. The one or more non-volatile, machine-readable storage media according to claim 14, wherein the step of acquiring voltages of three terminals of the three-phase brushless motor comprises:

acquiring voltages of two terminals of the three-phase brushless motor by two voltage measuring circuits that each of the voltage measuring circuit is connected to one terminal of the three-phase brushless motor, respectively;

determining the voltage of third terminal according to the voltages of the two terminals of the three-phase brushless motor and a preset balance relationship, wherein a test reference point of the two voltage measuring circuits is connected to the third terminal.

* * * * *